Patented Oct. 7, 1952

2,613,186

UNITED STATES PATENT OFFICE 2,613,186

CLEANING COMPOSITION

Charles F. Pickett, Bel Air, and Myer Rosenfeld, Aberdeen, Md.

No Drawing. Application December 23, 1948, Serial No. 67,082

4 Claims. (Cl. 252—170)

(Granted under the act of March 3, 1883, as amended April 30, 1928; 370 O. G. 757)

The invention described in the specification and claims may be manufactured and used by or for the Government for governmental purposes without the payment to us of any royalty thereon.

The present invention relates to compositions of matter for cleaning surfaces particularly metal surfaces.

An object of the invention is the provision of a cleaning composition by the use of which various soils such as grease, oil, and asphalt and the like adhering to metal surfaces may be easily and effectively removed therefrom, whether such materials appear singly as the soiling material or appear as two or more, or whether all of them are present on the soiled surface together.

A further object of the invention is the provision of a cleaning composition which may be used not only for cleaning plane metal surfaces such as appear, for example, on sheet iron or steel, but also for cleaning configured or complicated metal surfaces such as appear, for example, on automobile bodies, automobile engines, automobile chassis, and ordnance matériel such as combat tanks, trucks, cannon, rifles, etc.

We have discovered that mixtures of the following three components: high flash naphtha, kerosene, and a tertiary aliphatic alcohol are much more effective in removing grease, oil and asphalt from metal surfaces than any one or mixtures of any two of the said three components. Examples of tertiary aliphatic alcohols that may be employed as a component of the cleaning composition are tertiary butyl alcohol and diacetone alcohol. High flash naphtha referred to herein has the following physical properties: specific gravity, about 0.870 to about 0.890; boiling point range, from about 300° F. to about 400° F.; flash point, a minimum of about 100° F. The aromatic hydrocarbon content of the high flash naphtha may vary from about 85% to 100%.

The following examples give the ingredients and proportions of ingredients that may be used in preparing cleaning compositions according to the present invention, it being understood that these examples are give for purposes of illustration only and that the invention is not limited thereto. The cleaning compositions are prepared from the ingredients stated in the specific examples by mixing in any order the indicated proportions of the ingredients. To the cleaning compositions according to the present invention there may be added emulsifying agents, wetting agents, detergents, or any other agents compatible with the compositions, according to need or desire. In the following examples, and throughout this written description and in the claims, the percentages given are by volume.

Example I 66.5% high flash naphtha
28.5% kerosene
5.0% diacetone alcohol

Example II 70.0% high flash naphtha
27.0% kerosene
3.0% diacetone alcohol

Example III 90.0% high flash naphtha
7.0% kerosene
3.0% diacetone alcohol

Example IV 50.0% high flash naphtha
40.0% kerosene
10.0% diacetone alcohol

Example V 90.0% high flash naphtha
9.0% kerosene
1.0% diacetone alcohol

Example VI 35.0% high flash naphtha
52.0% kerosene
13.0% diacetone alcohol

Example VII

35% high flash naphtha
57% kerosene
8% tertiary butyl alcohol

Example VIII 66.5% high flash naphtha
30.5% kerosene
3.0% tertiary butyl alcohol

Example IX 90.0% high flash naphtha
9.0% kerosene
1.0% tertiary butyl alcohol

Example X 40.0% high flash naphtha
50.0% kerosene
10.0% tertiary butyl alcohol In the cleaning compositions according to the present invention, the proportions of the ingredients may vary within the following indicated ranges:

High flash naphtha from about 33% to about 90%;
Kerosene from about 7% to about 55%;
Diacetone alcohol or tertiary butyl alcohol from about 1% to about 15%

The composition or solution may be applied to the grease, oil, asphalt or the like on the metal surface to be cleaned by spraying or brushing it thereon or by immersing the metal surface to be cleaned in the solution or composition. The soil, if not removed completely by the treatment with the solution, may be washed off or removed from the metal surface by a stream of water at ambient temperature or at an elevated temperature and preferably under considerable pressure (about 40 to 50 p. s. i.) or by a stream of steam, or steam jet, preferably under considerable pressure. The pressure of water or steam should be sufficient to cause the treated grease, oil, or asphalt to flow away from the metal surface. If the soil has been removed by treatment with the solution, the same treatment with steam or water, as above described, may be used in treating the surface of the metal, in order to remove the cleaning solution and any soil residues from the metal surface.

If the composition is applied to the soil by spraying the metal surface with it, then a few minutes, for example, two (2) to five (5) minutes, should be allowed to elapse before utilizing water or steam as above described to cause the soil to flow away from the metal surface. An effective way of cleaning surfaces is to apply a stream of steam or steam jet upon the part or surface to be cleaned, after which the above described compositions are applied to the surface, whereupon the stream of steam or steam jet is again applied to the surface or part. A spray of treating composition or solution may be applied alternately several times with a jet or stream of steam to the surface to be cleaned. This last described procedure of applying the treating solution and the steam is a very effective manner of using the compositions of the present invention.

Another method of using the composition is by spraying the surface with copious volumes of the composition until the surface is clean. In this method of application, the subsequent treatment with water or steam may be omitted in those instances where the solution residues are unobjectionable. Where, however, these residues are objectionable, a subsequent treatment of the surface with a volatile solvent, water, or steam, may be used.

Still another method of using the compositions consists in thoroughly wetting the surface with the cleaning composition and then removing the soil by wiping or brushing it off. Also, in this instance, a subsequent treatment with a volatile solvent, water, or steam, may be used, if it is desired to avoid residues.

We claim:
1. A cleaning composition consisting essentially of from about 33% to about 90% of high flash naphtha, from about 7% to about 55% of kerosene, and from about 1% to about 15% of teritary butyl alcohol.
2. A cleaning composition consisting essentially of from about 33% to about 90% of high flash naphtha, from about 7% to about 55% of kerosene, and from about 1% to about 15% of diacetone alcohol.
3. A cleaning composition consisting essentially of from about 33% to about 90% of high flash naphtha, from about 7% to about 55% of kerosene, and from about 1% to about 15% of a tertiary aliphatic alcohol selected from the group consisting of diacetone alcohol and tertiary butyl alcohol.
4. A cleaning composition consisting essentially of from about 33% to 90% of high flash naphtha, from about 7% to about 55% of kerosene, and from about 1% to about 15% of a tertiary aliphatic alcohol selected from the group consisting of diacetone alcohol and tertiary butyl alcohol, admixed with a wetting agent.

CHARLES F. PICKETT.
MYER ROSENFELD.

REFERENCES CITED

The following references are of record in the file of this patent:

UNITED STATES PATENTS

| Number | Name | Date |
|---|---|---|
| 269,722 | Seebach | Dec. 26, 1882 |
| 985,405 | Ellis | Feb. 28, 1911 |
| 1,119,458 | Saxe | Dec. 1, 1914 |
| 1,167,641 | Ellis | Jan. 11, 1916 |
| 1,723,169 | Heydt | Aug. 6, 1929 |
| 1,855,872 | Shaw | Apr. 26, 1932 |
| 1,921,054 | Voress | Aug. 8, 1933 |
| 1,936,682 | Lovell | Nov. 28, 1933 |
| 2,004,628 | Keen | June 11, 1935 |
| 2,168,024 | Ensminger | Aug. 1, 1939 |
| 2,251,988 | Curran | Aug. 12, 1941 |
| 2,356,254 | Lehmann, Jr., et al. | Aug. 22, 1944 |

OTHER REFERENCES

National Paint Dictionary, 2 ed. Stewart, 1942, pgs. 75 and 90.